(12) United States Patent
Williams et al.

(10) Patent No.: US 11,559,922 B2
(45) Date of Patent: Jan. 24, 2023

(54) PULSED LIGHT SYSTEM

(71) Applicant: Heraeus Noblelight Ltd, Cambridge (GB)

(72) Inventors: David Philip Williams, Cambridge (GB); Jeremy Woffendin, Cambridge (GB); Martin Anthony Brown, Cambridge (GB)

(73) Assignee: Heraeus Noblelight Ltd, Cambridge (GB)

( * ) Notice: Subject to any disclaimer, the term of this patent is extended or adjusted under 35 U.S.C. 154(b) by 411 days.

(21) Appl. No.: 16/054,143

(22) Filed: Aug. 3, 2018

(65) Prior Publication Data
US 2018/0339434 A1 Nov. 29, 2018

Related U.S. Application Data

(63) Continuation of application No. PCT/GB2017/050273, filed on Feb. 3, 2017.

(30) Foreign Application Priority Data

Feb. 3, 2016 (GB) ...................... 1601974

(51) Int. Cl.
*B29C 35/02* (2006.01)
*B29C 35/08* (2006.01)
(Continued)

(52) U.S. Cl.
CPC .......... *B29C 35/0288* (2013.01); *B22F 10/20* (2021.01); *B23K 26/034* (2013.01);
(Continued)

(58) Field of Classification Search
CPC ............ B23K 35/0288; B23K 26/0846; B23K 26/034; B22F 3/1055; B29C 35/0288;
(Continued)

(56) References Cited

U.S. PATENT DOCUMENTS 5,912,470 A 6/1999 Eibofner et al.
6,208,783 B1 * 3/2001 Wach ..................... G02B 6/262
385/115
(Continued)

FOREIGN PATENT DOCUMENTS

CN 1250406 A 12/2000
CN 1732076 A 2/2006
(Continued)

OTHER PUBLICATIONS

Search Report for Application No. GB1601974.7 dated Jul. 29, 2016.
(Continued)

*Primary Examiner* — Daniel McNally
(74) *Attorney, Agent, or Firm* — EIP US LLP

(57) ABSTRACT

An apparatus for manufacturing a composite article from a composite material. The apparatus comprising: a pulsed broadband radiation source comprising a flashlamp and a light guide adapted to guide light emitted by the pulsed broadband radiation source to a target area. The light guide comprises at least a portion ahead of the pulsed broadband radiation source, relative to the target area, comprising a light transmitting material.

16 Claims, 11 Drawing Sheets

(51) Int. Cl.
  *B29C 70/38* (2006.01)
  *B22F 10/20* (2021.01)
  *B23K 26/03* (2006.01)
  *B23K 26/08* (2014.01)
  *B23K 35/02* (2006.01)
  *B29C 65/00* (2006.01)

(52) U.S. Cl.
  CPC ...... *B23K 26/0846* (2013.01); *B23K 35/0288* (2013.01); *B29C 35/0805* (2013.01); *B29C 66/83415* (2013.01); *B29C 66/91216* (2013.01); *B29C 66/91221* (2013.01); *B29C 70/388* (2013.01); *B29C 2035/0822* (2013.01); *B29C 2035/0827* (2013.01); *B29C 2035/0833* (2013.01)

(58) Field of Classification Search
  CPC .......... B29C 35/0805; B29C 66/91221; B29C 66/91216; B29C 66/83415
  See application file for complete search history.

(56) References Cited

U.S. PATENT DOCUMENTS

| | | | |
|---|---|---|---|
| 6,270,599 B1* | 8/2001 | Wood | B29C 35/10 156/272.2 |
| 6,451,152 B1* | 9/2002 | Holmes | B23K 26/034 156/173 |
| 6,713,713 B1* | 3/2004 | Caldwell | B23K 26/073 219/121.63 |
| 6,751,516 B1 | 6/2004 | Richardson | |
| 7,270,528 B2 | 9/2007 | Sherwood | |
| 2003/0209836 A1 | 11/2003 | Sherwood | |
| 2007/0047932 A1* | 3/2007 | Caldwell | B29C 65/1435 392/419 |
| 2007/0189018 A1 | 8/2007 | Tausch | |
| 2009/0234343 A1* | 9/2009 | Behrakis | A61B 18/203 606/9 |
| 2011/0248026 A1 | 10/2011 | Schroder et al. | |
| 2013/0025793 A1* | 1/2013 | Le Monnier | B23K 37/0294 156/379.6 |

FOREIGN PATENT DOCUMENTS

| | | |
|---|---|---|
| CN | 101563048 A | 10/2009 |
| CN | 104245279 A | 12/2014 |
| CN | 104748072 A | 7/2015 |
| CN | 104943158 A | 9/2015 |
| DE | 2552966 A1 | 11/1975 |
| EP | 0483782 A2 | 5/1992 |
| JP | 61196008 U | 12/1985 |
| JP | 6468250 B2 | 3/1989 |
| JP | H02049757 | 4/1990 |
| JP | 10182848 A | 7/1998 |
| JP | 2001522635 A | 11/2001 |
| JP | 2004284244 A | 10/2004 |
| JP | 2005334024 A | 12/2005 |
| JP | 2010015772 A | 1/2010 |
| JP | 2013020738 A | 7/2011 |
| WO | 9923968 A1 | 5/1999 |
| WO | 2005057670 A1 | 6/2006 |
| WO | 2014029969 A1 | 2/2014 |
| WO | WO-2014029969 A1 * | 2/2014 ............ B29C 70/54 |
| WO | 2014135176 A1 | 9/2014 |

OTHER PUBLICATIONS

Extended Search Report for Application No. GB1601974.7 dated Dec. 6, 2016.
International Search Report and Written Opinion for PCT Application No. PCT/GB2017/050273 dated Jul. 25, 2017.
Chinese Office Action dated Nov. 19, 2021 for Application No. 202010919677.0.
Japanese Notice of Allowance dated Feb. 4, 2015 for Application No. 2018-541220.

\* cited by examiner

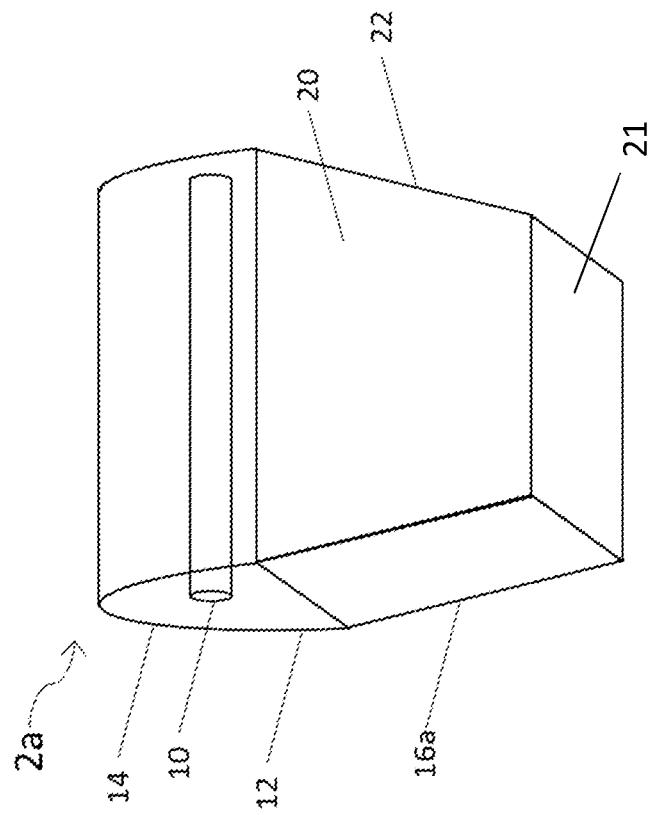
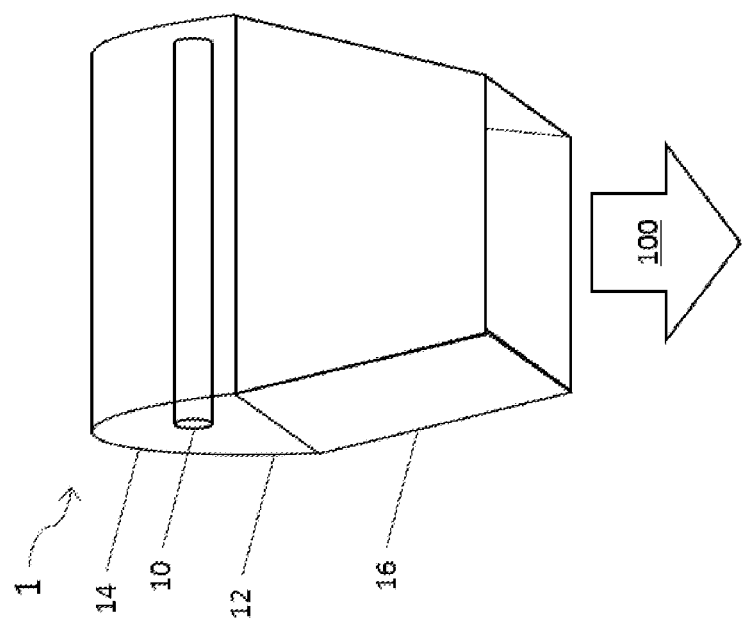

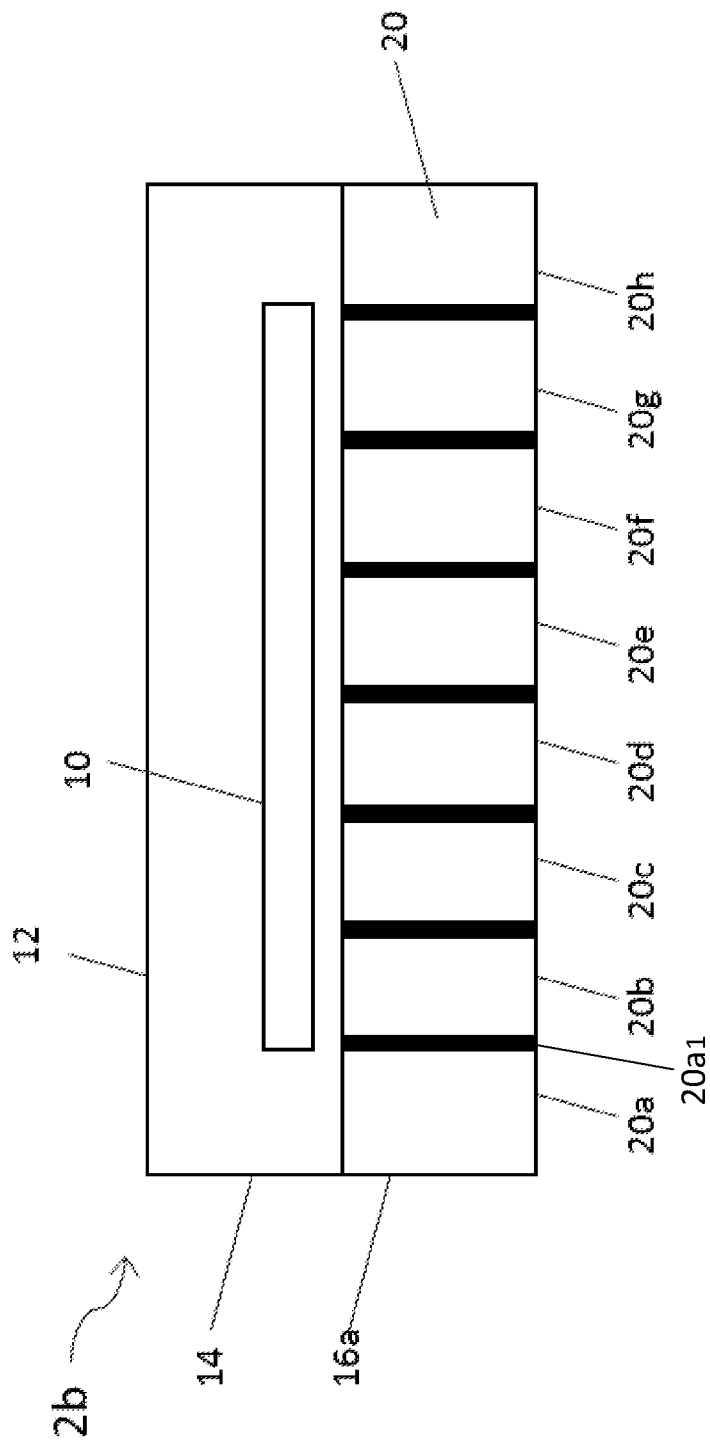

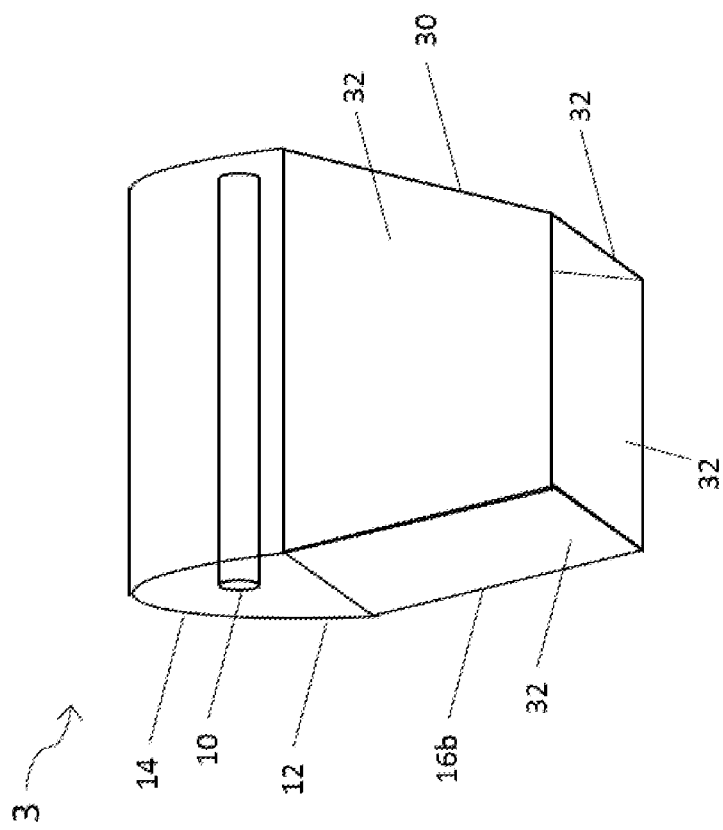

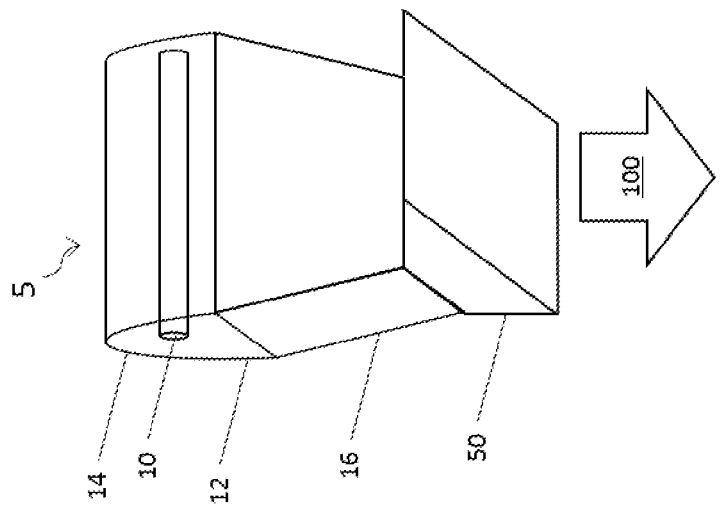
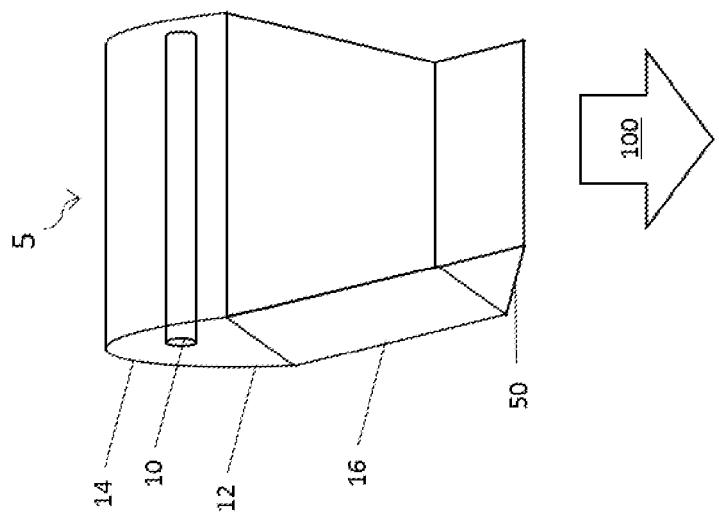
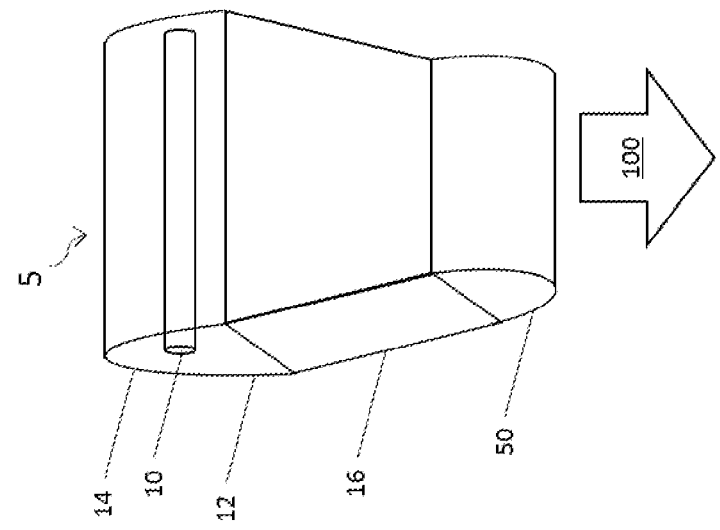

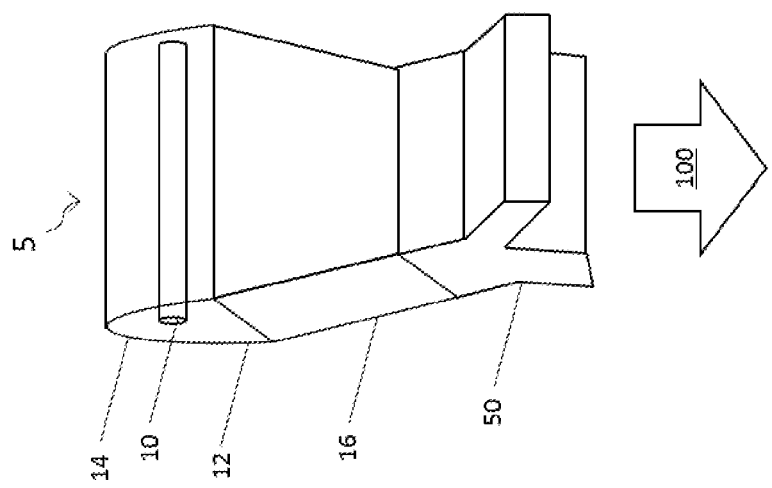
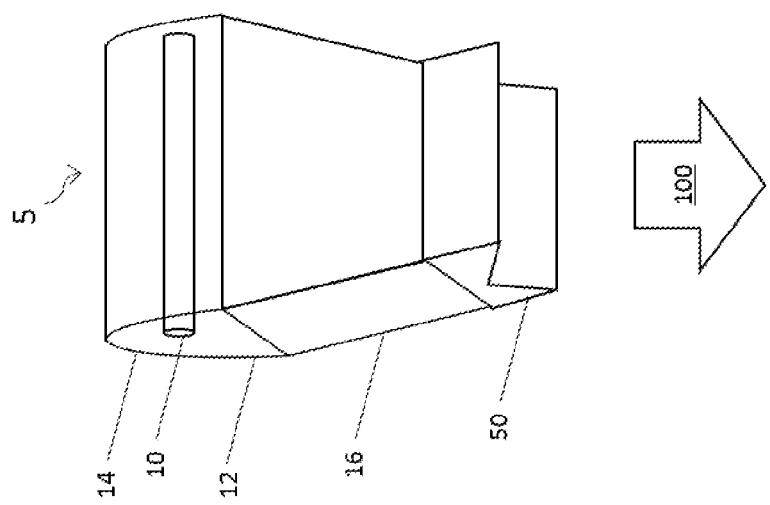
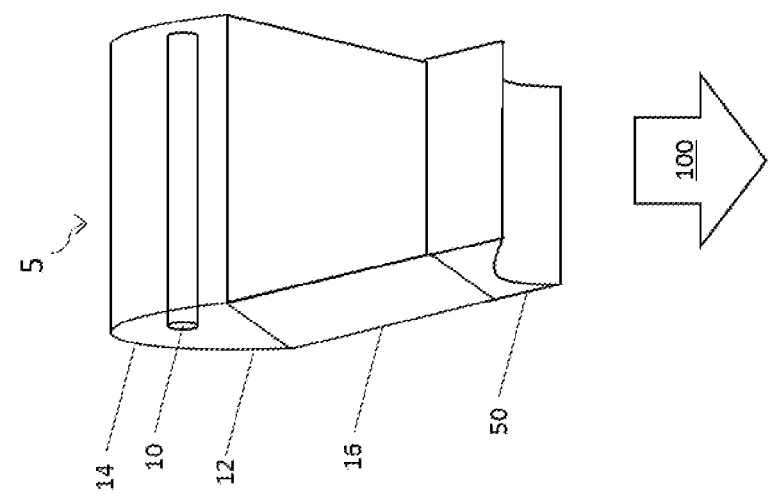

PULSED LIGHT SYSTEM

CROSS-REFERENCE TO RELATED APPLICATIONS

This application is a continuation of International Application No. PCT/GB2017/050273, filed Feb. 3, 2017, which claims priority to GB Application No. GB 16017974.3, filed Feb. 3, 2016, under 35 U.S.C. § 119(a). Each of the above-referenced patent applications is incorporated by reference in its entirety.

BACKGROUND OF THE INVENTION

Field of the Invention

The present invention relates to a pulsed light system using a pulsed broadband radiation source for use in industrial processes.

Description of the Related Technology

It is known to use pulsed broadband radiation sources for industrial processes such as, for example, composites manufacture, heating, thermal processing, cleaning and sintering. A pulsed broadband radiation source is selected based on the required wavelengths for the application required.

From WO2014/029969, it is known to manufacture a composite article from a composite material by exposing a contact surface to radiation pulses emitted by a pulsed broadband radiation source.

SUMMARY

According to a first aspect of the present invention, there is provided an apparatus for manufacturing a composite article from a composite material, the apparatus comprising a pulsed broadband radiation source comprising a flashlamp, and a light guide adapted to guide light emitted by the pulsed broadband radiation source to a target area, wherein the light guide comprises at least a portion ahead of the pulsed broadband radiation source, relative to the target area, comprising a light transmitting material.

The light guide is a guide for a band of radiation emitted by the pulsed broadband radiation source that is required for the specific application to be performed.

The apparatus may comprise an actuator to move one or more of the pulsed broadband radiation source and the light guide or a portion thereof.

According to a second aspect of the present invention, there is provided a method for manufacturing a composite article from a composite material, the method comprising emitting radiation from a pulsed broadband radiation source comprising a flashlamp, and guiding the light emitted from the pulsed broadband radiation source with a light guide, wherein the light guide comprises at least a portion ahead of the pulsed broadband radiation source, relative to a target area on a surface of the composite material, the portion ahead of the pulsed broadband radiation source comprising light transmitting material.

According to a third aspect of the present invention, there is provided a system comprising an apparatus according to the first aspect of the present invention, the apparatus comprising an actuator to move one or more of the pulsed broadband radiation source and the light guide or a portion thereof, the system further comprising a controller adapted to control the operation of the actuator.

According to a fourth aspect of the present invention, there is provided an apparatus comprising a pulsed broadband radiation source and a light guide adapted to guide light emitted by the pulsed broadband radiation source to a target area, wherein the light guide, or at least a portion thereof, and the pulsed broadband radiation source are adapted to be movable relative to one another.

According to a fifth aspect of the present invention, there is provided an apparatus comprising a pulsed broadband radiation source and a light guide adapted to guide light emitted by the pulsed broadband radiation source to a target area, wherein the light guide comprises at least a portion ahead of the pulsed broadband radiation source, relative to the target area.

According to a sixth aspect of the present invention, there is provided a heating system comprising an apparatus according to the fourth aspect of the present invention.

According to a seventh aspect of the present invention, there is provided a heating system comprising an apparatus according to the fifth aspect of the present invention.

According to an eighth aspect of the present invention, there is provided a cleaning system comprising an apparatus according to the fourth aspect of the present invention.

According to a ninth aspect of the present invention, there is provided a cleaning system comprising an apparatus according to the fifth aspect of the present invention.

According to a tenth aspect of the present invention, there is provided a sintering system comprising an apparatus according to the fourth aspect of the present invention.

According to an eleventh aspect of the present invention, there is provided a sintering system comprising an apparatus according to the fifth aspect of the present invention.

According to a twelfth aspect of the present invention, there is provided a method of transmitting radiation to a target area, the method comprising emitting radiation from a pulsed broadband radiation source, guiding the light emitted from the pulsed broadband radiation source with a light guide, and moving the pulsed broadband radiation source relative to the light guide or a portion thereof.

According to a thirteenth aspect of the present invention, there is provided a method for manufacturing a composite article from a composite material, the method comprising emitting radiation from a pulsed broadband radiation source, and guiding the light emitted from the pulsed broadband radiation source with a light guide, wherein the light guide comprises at least a portion ahead of the pulsed broadband radiation source, relative to a target area on a surface of the composite material.

Further features and advantages of the invention will become apparent from the following description of embodiments of the invention, given by way of example only, which is made with reference to the accompanying drawings.

BRIEF DESCRIPTION OF THE DRAWINGS

FIG. 1 is a schematic diagram of an isometric view of an apparatus according to embodiments of the present invention;

FIGS. 2*a*-*g* are schematic diagrams of isometric views of an apparatus according to embodiments of the present invention;

FIG. 3 is a schematic diagram of a front cross-section view of an apparatus according to embodiments of the present invention;

FIG. 4 is a schematic diagram of an isometric view of an apparatus according to embodiments of the present invention;

FIGS. 7a-f are schematic diagrams of isometric views of an apparatus according to embodiments of the present invention;

DETAILED DESCRIPTION OF CERTAIN INVENTIVE EMBODIMENTS

Figure 2B:
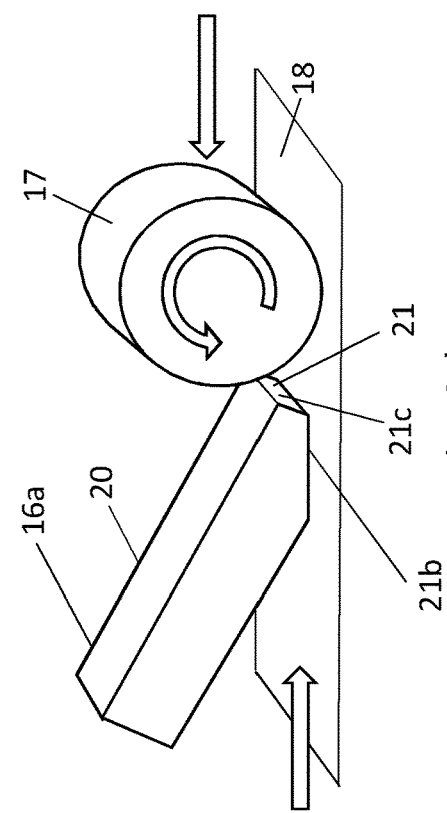

Various embodiments of the present invention will now be described in more detail with reference to the accompanying drawings. It will be appreciated that the invention is not limited in its application to the details of the methods and the arrangement of components as set forth in the following description or illustrated in the drawings. It will be apparent to the person skilled in the art that additional embodiments of the present invention not detailed in the description are possible and will fall within the scope of the present claims. Accordingly, the following description should not be interpreted as limiting in any way, and the scope of protection is defined solely by the claims appended hereto.

In general terms, embodiments of the present invention employ a pulsed broadband radiation source for irradiating in a controllable manner a "target area", and a light guide for guiding and/or focusing and/or concentrating light from the pulsed broadband radiation source to the target area. Embodiments of the present invention can be used in many different industrial processes such as, for example, sintering, thermal processing, cleaning and heating. The light guide is a guide for at least a part of the band of radiation emitted by the pulsed broadband radiation source that is required for the specific application to be performed. The light guide allows for greater control of the form or intensity of radiation at the target area, so that a predetermined radiation profile can be achieved at the target area. The radiation profile at the target area may define the shape and/or intensity of radiation at the target area.

Some embodiments of the present invention employ, as the pulsed radiation source, a flashlamp, for example a Xenon flashlamp, which may be of generally known kind, which can emit a relatively broadband radiation spectrum including one or more of infrared (IR), visible light and ultra-violet (UV) radiation components. Unless otherwise indicated, the terms 'flash' and 'pulse', and 'light' and 'radiation', may be used interchangeably herein at least in respect of flashlamp embodiments. In general terms, however, any other suitable pulsed radiation source may be employed according to alternative embodiments of the invention.

A pulsed broadband radiation source is capable of providing short pulses (or flashes) of a predetermined energy with a relatively wide spectral content. Flashlamps have been used in photographic applications, as well as in a number of scientific, industrial and medical applications. The use of a pulsed radiation system, rather than a continuous heating system, provides greater controllability of irradiation at the target area.

Known flashlamps typically comprise a length of glass tubing forming a closed bulb with electrodes at either end. The bulb is filled with a gas that, when 'triggered' by appropriate triggering circuitry, ionizes and conducts a high voltage pulse between the electrodes to produce the radiation (typically including visible light). Noble gases, such as Argon, Xenon and Krypton, can be used, and give different respective output spectra suitable for different applications. It is known to tune the output spectrum of a flashlamp by selecting different combinations of gas, gas pressure, voltage and current density among other things. Other gases including but not limited to Nitrogen, Neon or Helium may also be used. The glass making up the outer casing of a bulb may comprise fused quartz and can be doped with materials (such as cerium) in order to suppress or filter out unwanted parts of the spectrum. As used herein, for convenience, the term 'flashlamp' typically encompasses at least the bulb and the associated triggering circuitry.

The use of a pulsed broadband radiation source may be optimised by adjusting one or more of a number of system parameters, including but not limited to: the number of pulses, pulse width (or flash duration), pulse mark-space ratio, pulse intensity and pulse frequency. As will be described, a light guide can also be employed to focus and control the direction of emitted radiation.

Some embodiments may employ more than one radiation source. Such a configuration may increase the intensity of irradiation at the target area and/or may permit irradiation of a larger target area. In some embodiments, the radiation sources may be configured to provide greater control over the radiation profile at the target area. In some embodiments, the radiation sources may be pulsed alternately or in a predefined sequence to avoid overheating of the individual sources and/or of the overall apparatus. In some embodiments, the radiation source to be used may be selected based on the target area. Some embodiments may employ a radiation source in combination with a pulsed broadband radiation source. For example, in composite manufacture, the radiation source may be configured to heat the target area to a certain temperature and the pulsed broadband radiation source may be configured to apply additional heat at the target area by pulsing. For the purposes of this description, "manufacture" encompasses the manufacture of an article, the pre-processing of an article and/or of the materials used in the article, and/or post-processing of the manufactured article. Pre- and post-processing may, for instance, and without limitation, involve heating, curing, and other such processes. Such a configuration may also be employed for other processes.

FIG. 1 shows an apparatus 1 according to embodiments of the present invention. The apparatus 1 comprises a pulsed broadband radiation source 10 and a light guide 12. The light guide 12 comprises a first portion 14 behind the pulsed broadband radiation source 10, and a second portion 16 ahead of the pulsed broadband radiation source 10, relative to a target area, which is in the general direction of the arrow 100. The target area does not form part of the present invention.

In some embodiments, the first portion 14 and the second portion 16 of the light guide 12 are comprised in the same part. For example, the light guide 12 may be formed from a single sheet. In other embodiments the light guide 12 may be formed from plural parts, at least some of which are fastened and/or otherwise connected and/or bonded together. In yet more embodiments, the light guide may only comprise a portion in front of or behind the broadband radiation source relative to the target area. That portion may comprise one or more parts that are fastened and/or otherwise connected and/or bonded together.

In some embodiments, the apparatus of FIG. 1 is an apparatus for manufacturing a composite article from a composite material.

The first portion 14 of the light guide 12 is configured and arranged to reflect radiation emitted by the pulsed broadband radiation source 10 towards the second portion 16 of the light guide 12. In some embodiments, the first portion 14 of the light guide 12 comprises a light-reflective coating on its inner surface. The light-reflective coating may be selective of which wavelengths to reflect or may reflect a broad range of wavelengths.

As used herein, and throughout this description, a light-reflective coating may be defined in the following ways. This list is not exclusive, and other forms of light-reflective coatings would also be suitable. A diffuse material may be deposited onto a surface of the apparatus 1 to form a reflector. A metallic material may be deposited onto a surface of the apparatus 1 to form a reflector. Examples of suitable metallic materials comprise gold, aluminium, silver, steel, or other. Alternatively, or in addition, a non-metallic, reflective material may be deposited onto a surface of the apparatus 1 to form a reflector. A reflective material may be moulded to a shape of a surface of the apparatus 1 and affixed to that surface to form a reflector. The reflector may be permanently or removably or movably affixed to the apparatus. In some embodiments, the reflector may comprise a pattern to further direct light in a particular way.

In some embodiments, the first portion 14 of the light guide 12 is adapted to be movable relative to the pulsed broadband radiation source 10 and/or to the second portion 16 of the light guide 12. For example, the first portion 14 may be deformable or comprise a number of mechanically-linked segments that are movable in relation to one another, or it may be movable in any other way relative to the pulsed broadband radiation source 10 and/or to the first portion 14 of the light guide 12. Such movement of the first portion 14 of the light guide 12 may result in radiation emitted by the pulsed broadband radiation source 10 being reflected toward the second portion 16 of the light guide 12 at a predetermined intensity or angle of incidence, as required by a particular process being undertaken by the apparatus. In some embodiments, such movement of the first portion 14 of the light guide 12 relative to the pulsed broadband radiation source 10 and/or to the second portion 16 of the light guide 12 may occur during operation of the apparatus, as will be discussed in more detail hereinafter.

In some embodiments, the second portion 16 of the light guide 12 is adapted to be movable relative to the pulsed broadband radiation source 10 and/or to the first portion 14 of the light guide 12. For example, the second portion 16 may be deformable or comprise a number of mechanically-linked segments that are movable in relation to one another, or may be movable in any other way relative to the pulsed broadband radiation source 10 and/or to the first portion 14 of the light guide 12. Such movement of the second portion 16 of the light guide 12 may result in the formation of, or change in, a radiation profile at the target area. In some embodiments, such movement of the second portion 16 of the light guide 12 relative to the pulsed broadband radiation source 10 and/or to the first portion 14 of the light guide 12 may occur during operation of the apparatus, as will be discussed in more detail hereinafter.

In some embodiments, the light guide 12 guides radiation of a specific wavelength or range of wavelengths emitted by the pulsed broadband radiation source 10. For example, the light guide 12 may be transparent to infra-red wavelengths, but can reflect light in the visible spectrum. The composition of the light guide 12 is selected based on the process that the apparatus 1 is to be adapted for, and thus the wavelengths required at the target area.

In some embodiments, the pulsed broadband radiation source 10 is used to heat composite materials. In some embodiments, the apparatus 1 is arranged to heat material at the target area to a temperature between 30 and 600 degrees centigrade. For example, for thermoset materials the temperature range may be between 30 and 150 degrees. For dry fibre materials, the temperature range may be between 70 and 300 degrees. For thermoplastic materials, the range may be between 70 and 600 degrees. For other applications of the apparatus 1, the temperature required at the target area may be outside of this range, for example between 20 and 1000 degrees centigrade. The skilled person, based on the disclosure herein and an understanding of the parameters of his or her application, would be able to select the appropriate temperature profile and/or range.

In some embodiments, the amount of energy emitted per pulse of the pulsed broadband radiation source may be greater than/between 50 and 10,000 Joules and the average power emitted by the pulsed broadband radiation source may be between 50W and 32,000W.

FIGS. 2a-g show alternative embodiments of the present invention. Apparatus 2a is substantially similar to apparatus 1 and similarly-numbered features that are the same will not be described again. According to FIG. 2a, the second portion 16a of the light guide 12 of apparatus 2a comprises a block 20 of light transmitting material. The block 20 may comprise at least one of quartz, fused silica, BK7, KG3, Pyrex, Soda glass, Robax, or any other suitable light transmitting material. In some embodiments, the block 20 may comprise a liquid or a gel of light transmitting material, for example within a supporting structure or shaped container comprising a light transmitting material. In some embodiments, the supporting structure or shaped container may alternatively contain a gas that transmits light (or at least elements of light or radiation) emitted by the pulsed broadband radiation source 10. The shape of the block 20 of light transmitting material may be any shape capable of delivering light to the target area. For example, a geometry of the block 20 may be arranged so that the side walls of the block (of which there are four in FIG. 2a), or more particularly the internal surfaces thereof, generally act as reflectors, for instance by virtue of internal reflection of light emitted by and received from the pulsed broadband radiation source 10. The acute internal reflection angles within the block 20 cause light from the pulsed broadband radiation source 10 to be reflected from the internal surfaces of the walls back into the block 20 and generally towards the target area. In contrast, an input end, face or surface nearer to the pulsed broadband radiation source 10, and an output end, face or surface 21 further from the pulsed broadband radiation source 10 (and closest to the target area), transmit rather than reflect light emitted by and received from the pulsed broadband radiation source 10. Light directly from the pulsed broadband radiation source 10 (or indirectly from the pulsed broadband radiation source 10 via one or more reflections off the internal surfaces of the walls) does not impinge the output surface 21 at an acute angle and therefore can exit the block 20 through the output surface 21 and towards the target area. The form or profile of the output light is influenced significantly by the form of the output end, face or surface 21.

In effect, the block 20 focusses and/or concentrates light exiting the second portion of the light guide 16a, through the output surface 21, in a direction towards the target area. The output surface 21 in FIG. 2a comprises a flat, planar surface, which is shown to be generally parallel to a longitudinal axis of the pulsed broadband radiation source 10 and generally perpendicular to the direction of light exiting the block 20. In some embodiments, the shape of the output surface 21 of the block 20 is arranged to deliver a radiation profile required at the target area, examples of which are shown in FIGS. 2b-g.

In some embodiments, in use, the block 20 extends substantially from the pulsed broadband radiation source 10 to the target area. In some embodiments, in use, the output surface 21 of the block 20 does not contact the target area whereas in other embodiments it does.

In some embodiments, one or more surfaces of the block 20 comprise a light reflective coating 22, for example, which is arranged to confine light within the block. This, for example, may increase internal reflection, reducing light leakage from the sides of the block (for example, due to scattering resulting from internal and/or surface imperfections in the block or debris on the surface of the block) and/or, in general, delivering increased light to the target area. In some embodiments, each of the surfaces of the block 20, except for the input surface where light enters the block from the first portion 14 of the light guide 12 and the output surface 21 where light exits the block 20 toward the target area, comprise a light reflective coating 22. The light reflective coating 22 may increase the efficiency of the apparatus 2a by reflecting light back in to the block 20, which would otherwise have exited through a wall of the block 20 in a direction away from the target area.

In some embodiments, the light reflective coating 22 is substantially transparent to wavelengths emitted by the pulsed broadband radiation source 10 that are not required for the process that the apparatus 2a is adapted for. In some embodiments, for example when the apparatus 2a is used in the manufacture of a composite article from a composite material, the block 20 is highly transmissive to wavelengths of light emitted by the pulsed broadband radiation source 10, which heat the composite material, for example Infrared wavelengths. In some embodiments, the block 20 may be highly transmissive to UV wavelengths, for example, wherein the application is a curing application.

In some embodiments, the block 20 is highly transmissive of wavelengths between than 400 nm and 1 mm. In some embodiments, the block 20 is highly transmissive of wavelengths between than 700 nm and 1 mm.

FIGS. 2b-g show examples of the block 20 of the apparatus 2a in use in automated fibre placement for the manufacture of a composite article from a composite material. In each example, the shape and geometry of the block 20 is selected based on a radiation profile required at the target area. An output surface of the block 20 may be shaped, faceted or multi-faceted so that light exits the second portion of the light guide 16a to a target area in a desired radiation profile. The target area may be geometrically complex, for example it may comprise one shaped region or more than one region. Where there are plural regions of a target area, each region may reside in one plane or on more than one plane. For instance, the target area may lie on one or more areas of the same object or on plural different objects. In some embodiments, the shaped or faceted leading surface 21 focusses and/or concentrates light exiting the second portion of the light guide 16a in a direction towards the target area. The block 20 may be shaped to allow the block 20 to be positioned closer to the target area in use. For instance, the block 20 may be shaped to fit within a confined space or volume in order to be closer to a desired target area. In some examples, in relation to composite manufacture, the target area may comprise one or both of at least a portion of a compaction roller 17 and at least a portion of a substrate surface 18.

FIG. 2b shows a symmetrically chamfered block 20 with an output surface 21 comprising adjoining, symmetrical upper and lower chamfered surfaces or facets 21a, 21b joined via a central, forward-facing surface 21c. In this example, for convenience only, the first portion 14 of the light guide 12 and the pulsed broadband radiation source 10 are not shown. The block 20 is arranged and positioned relative to a compaction roller 17 and a substrate surface 18 in an exemplary composite manufacturing process. Arrows A, L, R in FIG. 2a show the direction of rotation of the compaction roller 17 and the relative movement of the compaction roller 17 and the substrate surface 18. The substrate surface 18, the compaction roller 17, or both, may be arranged to translate horizontally relative to one another as shown by the respective arrows.

As shown in FIG. 2b, the block 20 is arranged and positioned so that light exiting the forward-facing surface 21c impinges on a first region of a target area encompassing a nip point 17a where a compaction roller 17 comes into contact with a substrate surface 18. The compaction roller 17 may be used to apply pressure to the substrate surface 18 or to guide new material onto the substrate surface 18, and therefore the first region of the target area may be the outer surface of the compaction roller 17, or a layer of new material on the outer surface of the compaction roller 17 being added to the substrate 18. Light exiting through the upper chamfered surface 21a impinges on a second region of the target area encompassing a leading face of the compaction roller 17 in advance of the nip point 17a. Light exiting the lower chamfered surface 21c impinges on a third region of the target area encompassing a portion of the substrate surface 18 in advance of the nip point 17a. A general direction of light emerging from the three aforementioned facets of the block 20 is indicated pictorially using parallel arrows. In this way, the compaction roller 17 and the substrate surface 18 are pre-heated by radiation emitted through the chamfered surfaces 21a, 21b, before being heated further at the nip point 17a by radiation emitted through the forward-facing surface 21c.

Figure 2C:
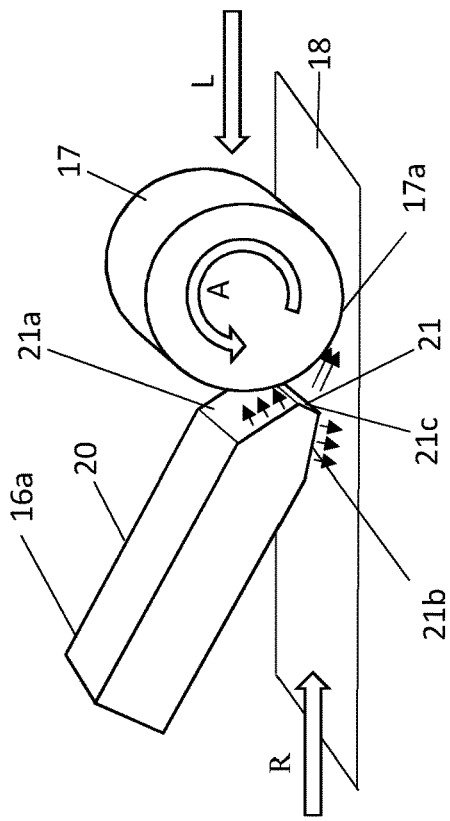

In some embodiments, the block 20 may comprise chamfers 21a, 21b arranged to be substantially parallel to respective region or regions of the target area. FIG. 2c shows a chamfer 21a substantially parallel to (that is, tangential to) the surface of the compaction roller 17 and a chamfer 21b substantially parallel to the substrate surface 18. By virtue of the ability for the entire surface areas of the chamfers 21a, 21b to be positioned more closely to the respective regions of the target area, this configuration may increase the radiation intensity at the respective regions of the target area compared to a non-parallel arrangement.

Figure 2D:
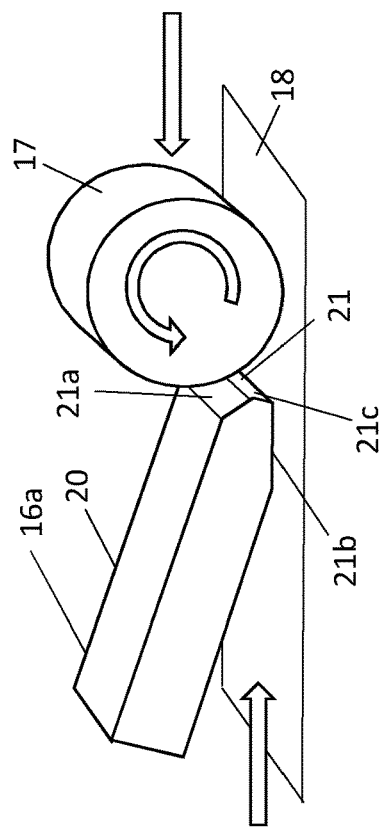

FIG. 2d shows a block 20 having an output surface 21 comprising a single, flat chamfered facet or surface 21b and an adjoining, flat forward-facing facet or surface 21c. This arrangement heats the nip point and pre-heats the substrate surface 18 but not the compaction roller 17.

Figure 2E:
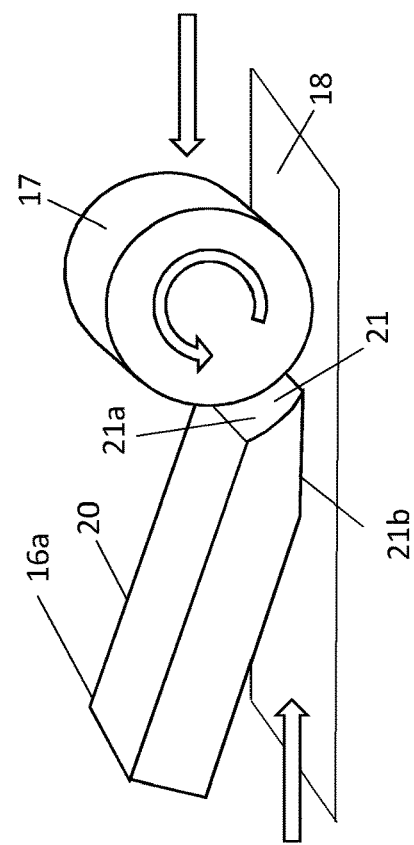

FIG. 2e shows a block 20 having an output surface 21 comprising a curved concave chamfer 21a, which has a radius of curvature substantially similar to the radius of the compaction roller 17, and a flat, planar chamfer 21*b*, which is substantially parallel to a substrate surface 18. This arrangement provides a more-efficient pre-heating of the curved surface of the compaction roller 17.

Figure 2F:
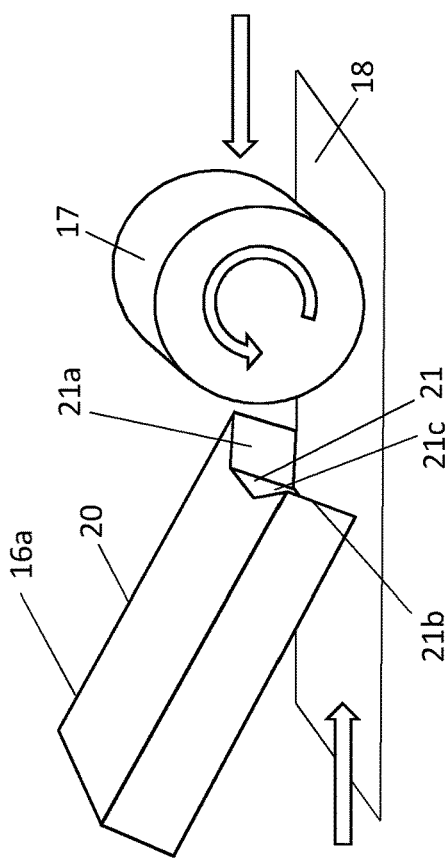

FIG. 2*f* shows a block 20 having a leading surface 21 comprising a flat, forward-facing facet 21*c* and two adjoining left and right flat chamfered facets 21*a*, 21*b*, forming a generally concave forward-facing output surface. This arrangement intensifies light radiation impinging on a target area encompassing the nip point and regions of the substrate surface 18 and compaction roller 17 immediately in advance of the nip point. In addition, or alternatively, in other embodiments, the concave arrangement may allow the output surface 21 of the block 20 to emit light more efficiently on to a convex target area, for example on to a convex object or substrate surface.

Figure 2G:
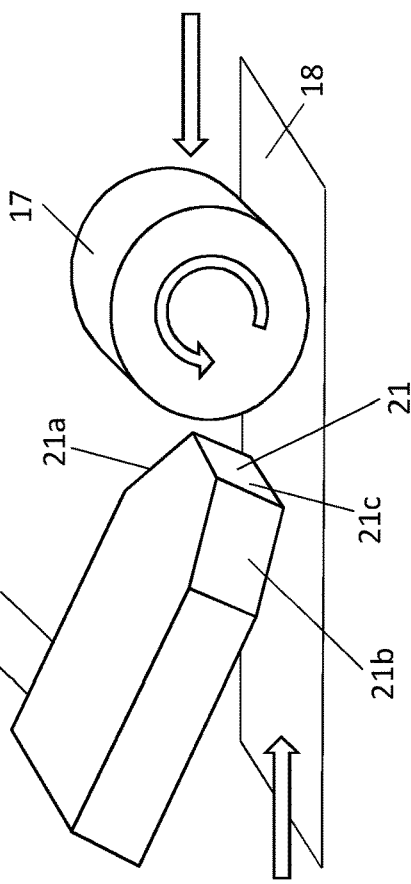

FIG. 2*g* shows a block 20 having a symmetrically chamfered leading surface 21 comprising two adjoining, left and right symmetrical chamfered surfaces 21*a*, 21*b*, joined via a central forward-facing surface 21*c* and forming a generally convex forward-facing output surface. The arrangement of the chamfered surfaces 21*a*, 21*b* tends to spread the light more widely than the width of the block 20, in front of the block. In addition, or alternatively, in other embodiments, the convex forward-facing output surface may facilitate a more efficient transfer of light on to a concave target area, for example on to a concave object or substrate surface 18.

FIGS. 2*b*-2*g* are shown by way of example only. Other geometries and arrangements of walls and surfaces of a block may alternatively be designed to suit all forms of target area. Such a block may comprise any shape that is suitable for delivering light having a desired radiation profile to a respective target area, which may be geometrically complex and/or comprise one or more regions.

FIG. 3 shows an apparatus 2*b* according to embodiments of the present invention. FIG. 3 is an alternative arrangement of apparatus 2*b*, wherein a block 20 of light transmitting material comprises two or more segments of light transmitting material. In this instance eight such segments 20*a-h* are shown. In some embodiments, each segment 20*a-h* may be separated by a barrier 20*a*1. In some embodiments, the barrier may be air. In other embodiments, the barrier may be a reflector or a light reflective coating on one or each intermediate surface of respective, neighbouring segments. A block comprising two or more segments 20*a-h* may produce a more uniform radiation profile at the target area. Light being guided through the second portion 16*a* of the light guide 12 is expected to follow a more linear path towards the target area.

In some embodiments, wherein the segments 20*a-h* comprise a gel or a liquid, one or more of the barriers separating the segments may be configured to move or deform, thus changing the shape of the respective segments 20*a-h*. In some embodiments, one or more of the segments 20*a-h* may be configured to move closer to or further away from the target area, or deform during operation of the apparatus 2*b*.

In some embodiments, the block 20 comprising two or more segments 20*a-h* may be shaped, faceted or chamfered, for example as shown in FIGS. 2*b-f*.

FIG. 4 shows an apparatus according to embodiments of the present invention. Apparatus 4 is substantially similar to apparatus in FIG. 1, wherein the second portion 16*b* of the light guide 12 of apparatus 3 comprises a hollow waveguide 30. The hollow waveguide 30 comprises at least one light reflective wall 32. In some embodiments, the hollow waveguide 30 comprises a plurality of light reflective walls 32. In some embodiments, the light reflective wall(s) 32 are transparent to wavelengths emitted by the pulsed broadband radiation source 10 that are not required for the process that the apparatus 3 is adapted for. In some embodiments, second portion 16*b* of the light guide 12 of may comprise the hollow waveguide 30 and a block of light transmitting material, as described with reference to FIGS. 2*a-g*. The block of light transmitting material may be closer to the target area than the hollow waveguide 30, or vice versa.

In some embodiments, the at least one light reflective wall 32 forms a closed cross-section, such that light emitted by the pulsed broadband radiation source 10 cannot escape from the sides of the second portion 16*b* of the light guide 12 formed by the at least one light reflective wall 32. This may increase the radiation intensity at the target area compared to an open cross-section. The shape of the closed cross-section may be any shape capable of providing the required radiation profile at the target area. In other embodiments, the light reflective walls 32 do not form a closed cross-section.

Figure 5C:
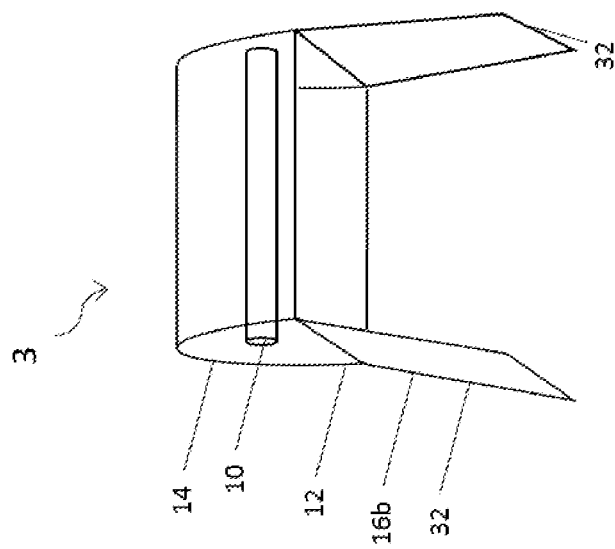
FIGS. 5a-c are schematic diagrams of isometric views of an apparatus according to embodiments of the present invention.
Figure 5B:
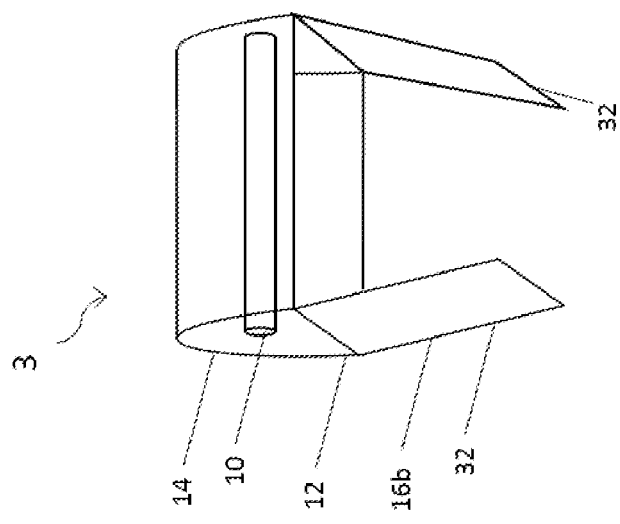
Figure 5A:
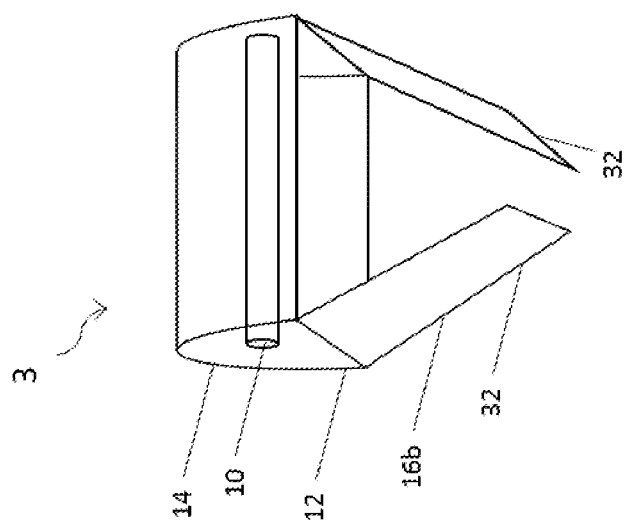

FIGS. 5*a-c* show views of an embodiment according to apparatus 3 of the present invention. The front and rear walls 32 of the hollow waveguide 30 are not shown, for the sake of clarity. Indeed, in some embodiments, the apparatus 3 does not comprise front and rear walls 32. In other embodiments, the walls 32 may be configured in any other suitable arrangement such that the walls individually or together may act as baffles or blinkers to guide and/or tune the form or profile of the emitted light. According to these embodiments of the present invention, at least one of the light reflective walls 32 of the hollow waveguide 30 is movable relative to the other(s). Movement of the, or each, wall 32 results in a predetermined change in the radiation profile at the target area. In some embodiments, the walls 32 rotate about an axis, for example, comprising a hinge arrangement or such like. In other embodiments, one or more of the walls 32 are deformable. In other embodiments, one or more of the walls 32 are movable in any other way relative to the other(s).

Figure 6C:
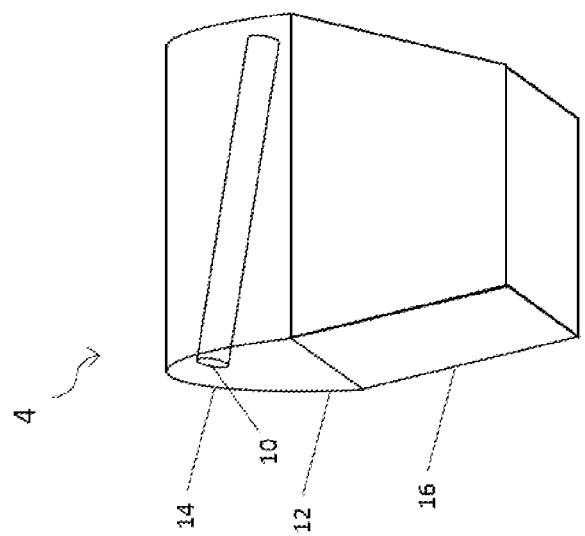
FIGS. 6a-c are schematic diagrams of isometric views of an apparatus according to embodiments of the present invention.
Figure 6B:
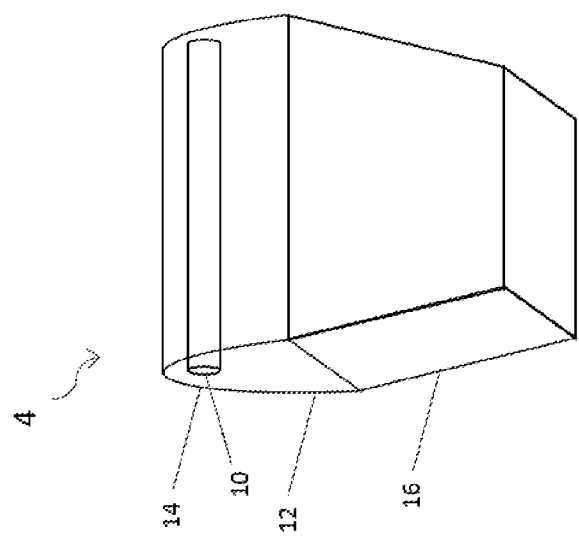
Figure 6A:
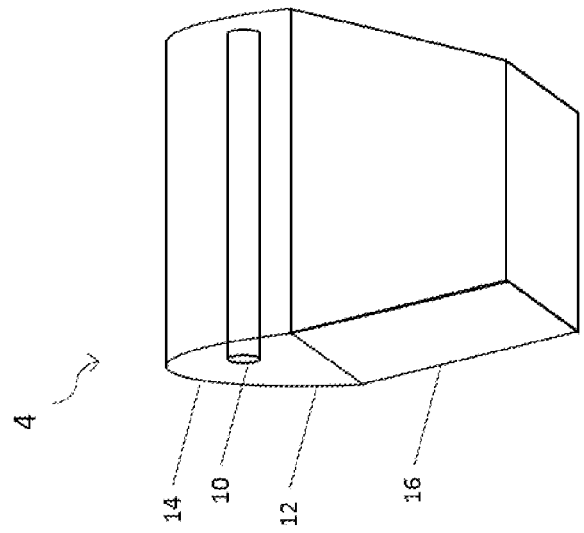

FIGS. 6*a-c* show views of embodiments according to the present invention. Apparatus 4 may be substantially similar to any apparatus that is described above with reference to FIGS. 1-5 and may be usable alone or in combination with any features thereof. The pulsed broadband radiation source 10 of apparatus 4 is adapted to be movable relative to the light guide 12. In some embodiments, the pulsed broadband radiation source 10 is adaptable to be movable relative to the light guide 12 during operation of the apparatus 4.

In some embodiments, the pulsed broadband radiation source 10 is mounted and/or adapted to translate within the first portion 14 of the light guide 12, for example, such that the orientation of a longitudinal axis of the source remains constant relative to the orientation of the light guide 12. In some embodiments, the pulsed broadband radiation source 10 is mounted and/or adapted to tilt or rotate relative to the light guide 12, for example, such that the orientation of a longitudinal axis of the source changes relative to the orientation of the light guide 12. For example, the pulsed broadband radiation source 10 adapted so that a first end can be moved in one direction, while a second end remains stationary, or the second end can be moved in a different direction, or the second end can be moved in the same direction but by a different amount to the first end.

In some embodiments, for example according to apparatus 4, more generally, the pulsed broadband radiation source 10 and at least a portion 14, 16 of the light guide 12 are movable relative to one another. Indeed, there may be more than one radiation source and then one or more of the sources and the light guide may be movable relative to one another.

FIGS. 7a-f show views of embodiments according to the present invention. Apparatus 5 may be substantially similar to any apparatus that is described above with reference to FIGS. 1-6 and may be usable alone or in combination with any features thereof. In particular, the second portion of the light guide may comprise a block of light transmitting material and/or may comprise a hollow waveguide. In either case, the second portion 16 of the light guide 12 is augmented by a shaped lens 50. In some embodiments, the shaped lens 50 may be between the first portion 14 and the second portion 16 of the light guide (not shown). In other embodiments, the shaped lens 50 may be at any other point in the second portion 16 of the light guide 12.

In some embodiments, the shaped lens 50 shapes, focusses and/or concentrates light exiting the second portion of the light guide 16 in a direction towards the target area, which is in the general direction of the arrow 100. In other embodiments, the shaped lens 50 refracts light exiting the second portion of the light guide 16. The shaped lens 50 may comprise any shape that is suitable for delivering light having a desired radiation profile to the target area. Alternative examples of shapes of a shaped lens 50 are shown in FIGS. 7a-f. FIG. 7a shows a convex lens 50, comprising a convex output face, which may evenly distribute light over the target area. FIG. 7b shows a prism-like lens 50 comprising two output faces or facets, which may split light exiting the light guide 12 between each face or facet. FIG. 7c shows a trapezoidal lens, which has a base forming an output face of the lens, which increases the effective size of the output face of the light guide 16 and which may thereby distribute light on to an area larger than the size of the light guide 12 absent the lens. FIG. 7d shows a concave lens 50, which may focus light on to a smaller area than the size of the light guide 12. FIG. 7e shows a polygonal lens 50, having two output facets forming a generally concave output face, which may direct light to a plurality of locations on the target area. FIG. 7f shows a y-shaped lens 50 having an output face, similar to but larger than the output face of FIG. 7e, which may focus light intensely on a specific region.

In some embodiments, shaped lenses may be detachable and/or interchangeable depending on their desired purpose. The particular lens 50 required is selected based on the required radiation profile at the target area.

Figure 8:
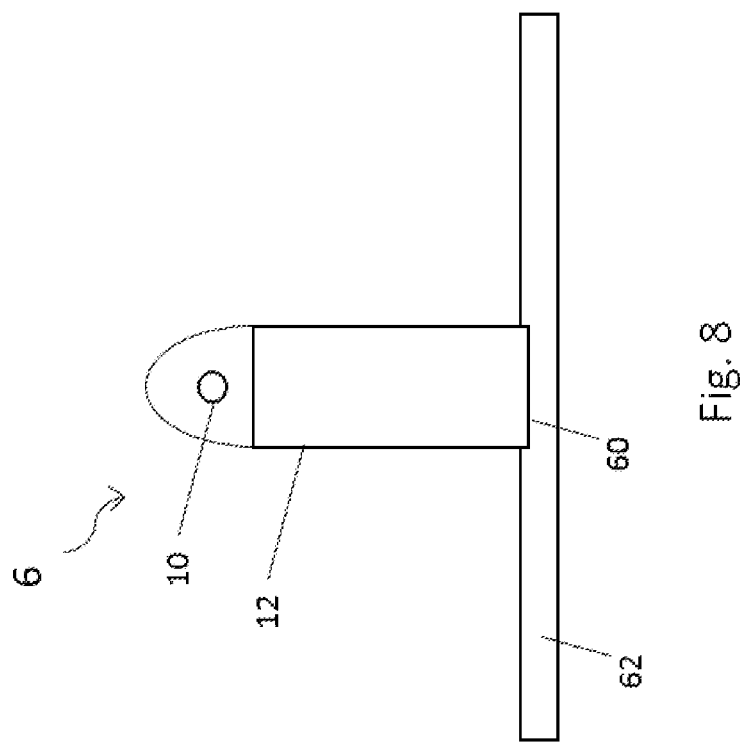
FIG. 8 is a schematic diagram of a side cross-section view of an apparatus according to embodiments of the present invention.

FIG. 8 shows an apparatus 6 according to embodiments of the present invention. Apparatus 6 may comprise an apparatus as herein described with reference to any of FIGS. 1 to 7, and which is adapted in addition to comprise a contact surface 60. The contact surface 60 may be placed in contact with, for instance in order to apply pressure to, a contact region of an object 62. In this way, the apparatus may, for example, be used to heat an object and apply pressure to the object, either simultaneously or sequentially, in order to support or complete a bonding operation. In some embodiments, the contact region is at or near the target area. In some embodiments, the target area is on the object 62.

In some embodiments, the contact region of the object 62 substantially matches the target area. In other embodiments, the contact region substantially matches, and/or overlaps with, a portion of the target area. In other embodiments, the contact region surrounds the target area. For example, the contact region may be an annulus with the target area at or near to its centre. In other embodiments, the contact region is adjacent to the target area, such that pressure is applied to a contact region of the object 62 after that area has been irradiated by the apparatus 6.

In some embodiments, apparatus 6 is adapted for use in thermally processing composites, for example in order to heat and adhere layers of composite material into a composite article. The object 62 may then be a composite comprising layers of composite material that is heatable by the pulsed broadband radiation source 10. The contact surface 60 is configured to apply pressure to the composite in order to compress the contact region of the object 62 before, during and/or after heating of the target area, such that the layers of the composite material within the object 62 are tacked together while being heated or while still hot. In some embodiments, only specific areas of the object 62 are tacked.

In some embodiments, the contact surface 60 is integral to the second portion 16 of the light guide 12. In some embodiments, wherein for example the second portion 16 of the light guide 12 of apparatus 6 comprises a block 20 of light transmitting material, the contact surface 60 is an output surface 21 of the block 20. The output surface of the block 20 may be a shaped and/or faceted leading surface 21, examples of which are shown in FIGS. 2b-g.

In some embodiments, the contact surface 60 is comprised in a shaped lens 50 as illustrated in FIGS. 7a-f.

Figure 9:
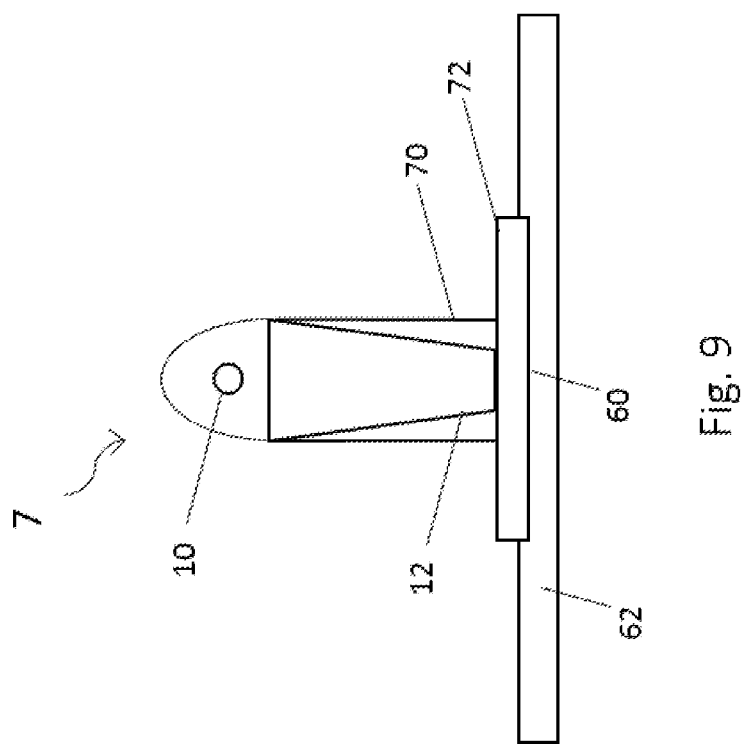
FIG. 9 is a schematic diagram of a side cross-section view of an apparatus according to embodiments of the present invention.

FIG. 9 shows an apparatus 7 according to embodiments of the present invention. Apparatus 7 may comprise an apparatus as described herein with reference to any of FIGS. 1 to 7, a contact surface 60, and a support frame 70. The contact surface 60 is configured to apply pressure by the apparatus 7 to a contact region of an object 62. In some embodiments, the contact region is at or near the target area. In some embodiments, the target area is on the object 62. The support frame 70 is arranged to hold the contact surface 60 in a position relative to the target area.

In some embodiments, the contact surface 60 is a surface on a cradle 72. The cradle 72 is transparent to radiation emitted by the pulsed broadband radiation source 10. The cradle 72 may be any shape that is suitable for applying pressure at the contact region. In some embodiments, the cradle 72 is movable relative to the target area.

In some embodiments, the supporting frame 70 is adapted to be adjustable, such that the distance between the light guide 12 and the contact surface 60 can be altered. In some embodiments, pressure from the apparatus 7 is transferred through the support frame 70 to the contact surface 60, without force being applied through the light guide 12.

Figure 10:
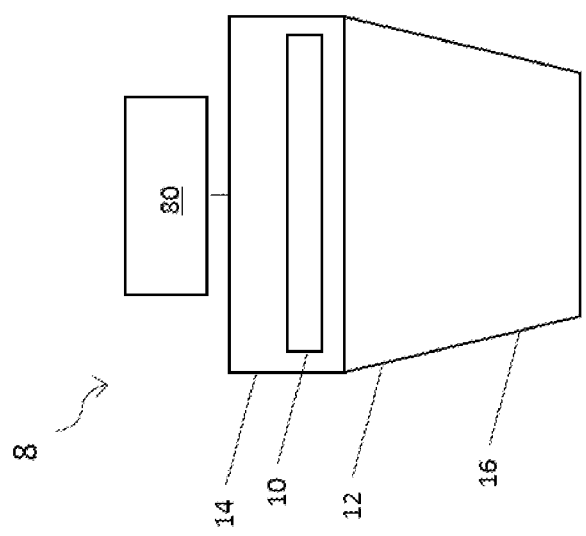
FIG. 10 is a schematic diagram of an apparatus according to embodiments of the present invention.

FIG. 10 illustrates an apparatus according to embodiments of the present invention. The apparatus 8 may comprise any one of the apparatus, as described herein with reference to any of FIGS. 1 to 9, and includes an actuator arrangement 80. The actuator arrangement 80 is arranged to move one or more of the pulsed broadband radiation source 10, the first portion 14 of the light guide 12 and the second portion 16 of the light guide 12 relative to the other(s) of the first portion 14, the second portion 16 and the pulsed broadband radiation source 10.

In some embodiments, the actuator arrangement 80 may comprise a plurality of actuators. In some embodiments, the actuator arrangement 80 may actuate two or more components of the apparatus 8 substantially simultaneously. In some embodiments, the actuator arrangement 80 may operate during operation of the apparatus 8 and/or the pulsed broadband radiation source 10.

Substantially simultaneously in this context may mean at the same time or it can also mean that two or more operations are performed during the period of one overall operation. Substantially simultaneously may also mean the performance of fractions of two or more operations alternately until they are both complete.

Figure 11:
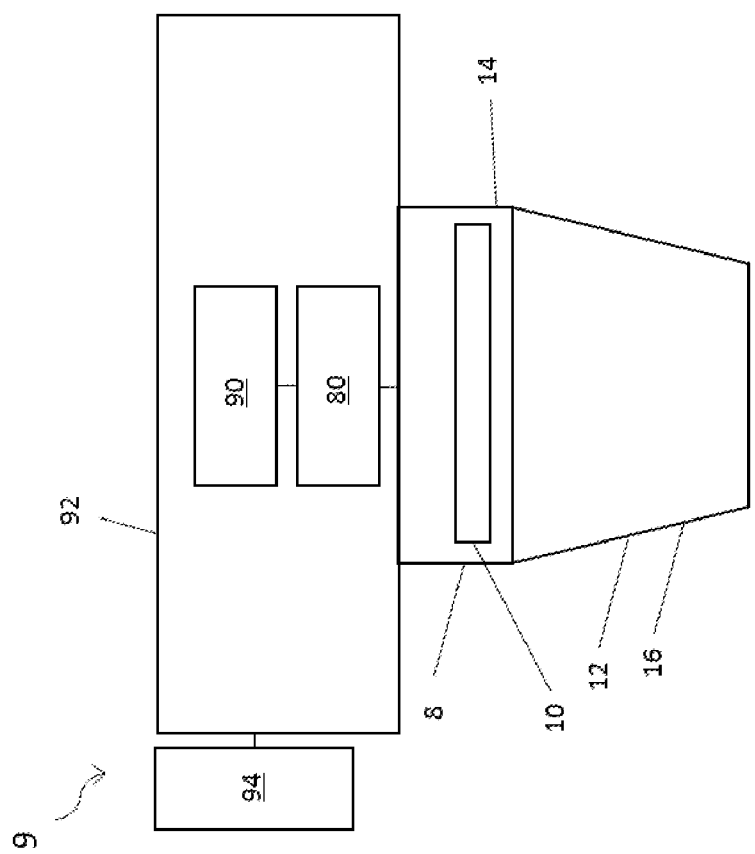
FIG. 11 is a schematic diagram of a system according to embodiments of the present invention.

FIG. 11 is a schematic diagram of a system according to embodiments of the present invention. System 9 comprises the apparatus 8 and a controller 90. The controller 90 is adapted to control the operation of the actuator arrangement 80. The controller 90 is adapted to control when the actuator arrangement 80 is actuated. In some embodiments, the controller 90 is adapted to control the distance of actuation and/or the speed of actuation of the actuator arrangement 80.

In some embodiments, the controller 90 is pre-programmed according to the parameters of an operation to be undertaken by the system 9. For example, the shape of a required radiation profile at the target area may be arranged to vary over the period of an operation. In other embodiments, the controller 90 may be responsive to a signal and/or data that is received, for example, during an operation. For example, the signal/data may be received from a feedback circuit or any other similar arrangement (not shown). Such a feedback arrangement may, for example, measure temperature at a target area and/or the size of a target area, so that the apparatus may be controlled to maintain the temperature and/or target area size (or, indeed, any other measurable parameter) during an operation in which the apparatus (or elements thereof) and/or a target object are moved or are movable relative to one another.

In some embodiments, the system 9 comprises a head 92 on which the apparatus 8 is mounted. In some embodiments, the apparatus 8 is integral to the head 92. In other embodiments, the apparatus 8 may be fixedly or pivotably mounted to the head 92.

In some embodiments, the system 9 further comprises a second controller 94 to control movement of the head 92 relative to a target object (not shown). The target area is then directed to the target object.

In some embodiments, the head 92 and target object are adapted to move (for example to reciprocate) in a plane parallel to one another. In addition, or alternatively, according to some embodiments, the head 92 and target object are adapted to move closer to and further away from the target object.

In some embodiments, at least one of the first and second controllers 90, 94 are operable during operation of the system 9. In some embodiments, the first controller 90 and the second controller 94 are operable substantially simultaneously during operation of the system 9. Such a configuration allows the system 9 to accommodate a radiation profile at the target area, which is maintained or changed during operation of the system 9.

The system 9 may be any one of a heating system, a thermal processing system, a cleaning system and a sintering system. The system 9 may be any other system wherein a pulsed broadband radiation source 10 is suitable for carrying out a process.

Embodiments of the present invention include methods of transmitting radiation to a target area. Radiation is emitted from a pulsed broadband radiation source, and is guided from the pulsed broadband radiation source with a light guide to a target area. The light guide being according to any of the light guides described herein with reference to the figures.

In some embodiments, the method further comprises moving at least one of the first portion, the second portion and the pulsed broadband radiation source relative to the other(s) of the first portion, the second portion and the pulsed broadband radiation source.

Another embodiment of the present invention provides a method for manufacturing a composite article from a composite material. Radiation is emitted from a pulsed broadband radiation source, and is guided from the pulsed broadband radiation source with a light guide to a target area on a surface of the composite material.

In some embodiments, the methods comprise moving at least one of the first portion of the light guide, the second portion of the light guide and the pulsed broadband radiation source relative to the other(s) of the first portion of the light guide, the second portion of the light guide and the pulsed broadband radiation source during operation of the apparatus, in order to modify or maintain the form of the target area, or an intensity of radiation at the target area.

In some embodiments, the methods comprise applying, with a contact surface, pressure by the apparatus to a contact region of an object. In some embodiments, pressure is applied through a frame supporting the contact surface.

In some embodiments, the method is a method of thermally processing composites.

1. An apparatus for manufacturing a composite article from a composite material, the apparatus comprising: a pulsed broadband radiation source comprising a flashlamp; and a light guide adapted to guide light emitted by the pulsed broadband radiation source to a target area, wherein the light guide comprises at least a portion ahead of the pulsed broadband radiation source, relative to the target area, comprising a light transmitting material.

2. An apparatus according to claim 1, wherein the light guide comprises a portion behind the pulsed broadband radiation source, relative to the target area.

3. Apparatus according to either preceding claim, wherein at least a portion of the light guide is adapted to be movable relative to the pulsed broadband radiation source during operation of the apparatus.

4. An apparatus according to any one of the preceding claims, wherein the light transmitting material is configured to transmit infrared wavelengths emitted by the pulsed broadband radiation source.

5. An apparatus according to any one of the preceding claims, wherein the portion of the light guide ahead of the pulsed broadband radiation source, relative to the target area, comprises a block of light transmitting material.

6. An apparatus according to claim 5, wherein the block comprises two or more segments of light transmitting material.

7. An apparatus according to claim 5 or claim 6, wherein the block comprises quartz.

8. An apparatus according to claim 5 or claim 6, wherein the block comprises silica glass.

9. An apparatus according to any of claims 5 to 8, wherein at least one surface of the block comprises a light reflective coating.

10. An apparatus according to any of claims 5 to 9, wherein an output surface of the block is configured so that light exits the block to provide a predetermined radiation profile at the target area.

11. An apparatus according to claim 10, wherein the output surface of the block is shaped and/or faceted to provide the desired radiation profile.

12. An apparatus according to any of claims 1 to 3, wherein the portion of the light guide ahead of the pulsed broadband radiation source, relative to the target area, comprises a hollow waveguide.

13. An apparatus according to claim 12, wherein the waveguide comprises a plurality of light reflective walls, at least one of which is movable relative to the other(s).

14. An apparatus according to claim 13, wherein the pulsed broadband radiation source is adapted to translate, tilt and/or rotate in relation to the light guide.

15. An apparatus according to any one of the preceding claims, wherein the portion of the light guide ahead of the pulsed broadband radiation source, relative to the target area, comprises a shaped lens.

16. An apparatus according to any one of the preceding claims, further comprising a contact surface for applying pressure by the apparatus to a contact region of an object.

17. An apparatus according to claim 16, wherein the contact region is at or near the target area.

18. An apparatus according to claim 17, wherein the target area is on the object.

19. An apparatus according to any one of claims 16 to 18, wherein the contact surface is integral with the portion of the light guide ahead of the pulsed broadband radiation source, relative to the target area.

20. An apparatus according to any one of claims 16 to 19, when dependent on claim 15, wherein the contact surface is comprised in the shaped lens.

21. An apparatus according to any one of claims 16 to 19, when dependent on claim 9 or 10, wherein the contact surface is comprised in the output surface of the shaped block.

22. An apparatus according to any one of claims 16 to 20, further comprising a support frame configured to hold the contact surface in a position relative to the light guide.

23. An apparatus according to any one of claim 16 to 20 or 22, wherein the contact surface is comprised in a radiation-transparent cradle.

24. An apparatus according to any one of the preceding claims, further comprising an actuator to move one or more of the pulsed broadband radiation source and the light guide or a portion thereof.

25. A method for manufacturing a composite article from a composite material, the method comprising: emitting radiation from a pulsed broadband radiation source comprising a flashlamp; and guiding the light emitted from the pulsed broadband radiation source with a light guide, wherein the light guide comprises at least a portion ahead of the pulsed broadband radiation source, relative to a target area on a surface of the composite material, the portion ahead of the pulsed broadband radiation source comprising light transmitting material.

26. A method according to claim 25, wherein the light guide comprises a first portion behind the pulsed broadband radiation source, relative to the target area.

27. A method according to claim 25 or claim 26, comprising moving at least a portion of the light guide and the pulsed broadband radiation source relative to one another during operation of the apparatus, in order to modify or maintain the form of the target area, or an intensity of radiation at the target area.

28. A method according to any of claims 25 to 27, comprising transmitting light via the light guide in a predetermined radiation profile to the target area.

29. A method according to any of claims 25 to 28, wherein the light transmitting material is configured to transmit infrared wavelengths emitted by the pulsed broadband radiation source.

30. A method according to any of claims 25 to 29, wherein the portion of the light guide ahead of the pulsed broadband radiation source, relative to the target area comprises a block of light transmitting material.

31. A method according to claim 30, wherein the light transmitting material comprises two or more segments.

32. A method according to claim 30 or 31, wherein the light guide comprises a light reflective coating on at least one surface of the block of light transmitting material.

33. A method according to any of claims 30 to 32 and 28, wherein an output surface of the block is shaped and/or faceted to provide the desired radiation profile.

34. A method according to any of claims 25 to 29, wherein at least a portion of the light guide is ahead of the pulsed broadband radiation source, relative to the target area, and comprises a hollow waveguide.

35. A method according to 34, comprising moving at least one of a plurality of light reflective walls comprised in the hollow waveguide, relative to the other(s).

36. A method according to any one of claims 25 to 35, comprising tilting and/or rotating the pulsed broadband radiation source in relation to the light guide.

37. A method according to any one of claims 25 to 36, comprising moving the pulsed broadband radiation source relative to the light guide or at least a portion thereof with an actuator.

38. A method according to any of claims 25 to 37, wherein the portion of the light guide ahead of the pulsed broadband radiation source, relative to the target area, comprises a shaped lens.

39. A method according to any of claims 25 to 38, comprising applying, with a contact surface, pressure by the apparatus to a contact region of an object.

40. A method according to claim 39, wherein the contact region is at or near the target area.

41. A method according to claim 40, wherein the target area is on the object.

42. A method according to any one of claims 39 to 41, wherein the contact surface is integral with the portion of the light guide ahead of the pulsed broadband radiation source, relative to the target area.

43. A method according to any one of claims 42 and 38, wherein the contact surface is comprised in the shaped lens.

44. A method according to any one of claims 42 and 33, wherein the contact surface is comprised in the output surface of the shaped block.

45. A method according to any of claims 39 to 43, further comprising a support frame configured to hold the contact surface in a position relative to the light guide.

46. A method according to any one of claim 39 to 43 or 45, wherein the contact surface is comprised a radiation-transparent cradle.

47. A method of thermally processing composites, the method comprising a method according to any of claims 25 to 46.

48. A system comprising: the apparatus of claim 24; and a controller adapted to control the operation of the actuator.

49. A system according to claim 48, further comprising: a head on which the apparatus is mounted; and a second controller to control movement of the head relative to a target object, wherein the target area is on the target object.

50. A system according to claim 49, wherein the first and second controllers are operable substantially simultaneously during operation of the system.

An apparatus comprising: a pulsed broadband radiation source; and a light guide adapted to guide light emitted by the pulsed broadband radiation source to a target area, wherein the light guide, or at least a portion thereof, and the pulsed broadband radiation source are adapted to be movable relative to one another.

An apparatus for manufacturing a composite article from a composite material, the apparatus comprising: a pulsed broadband radiation source; and a light guide adapted to guide light emitted by the pulsed broadband radiation source to a target area, wherein the light guide comprises at least a portion ahead of the pulsed broadband radiation source, relative to the target area.

A heating system comprising an apparatus, the apparatus comprising: a pulsed broadband radiation source; and a light guide adapted to guide light emitted by the pulsed broadband radiation source to a target area, wherein the light guide, or at least a portion thereof, and the pulsed broadband radiation source are adapted to be movable relative to one another.

A heating system comprising an apparatus, the apparatus comprising: a pulsed broadband radiation source; and a light guide adapted to guide light emitted by the pulsed broadband radiation source to a target area, wherein the light guide comprises at least a portion ahead of the pulsed broadband radiation source, relative to the target area.

A cleaning system comprising an apparatus, the apparatus comprising: a pulsed broadband radiation source; and a light guide adapted to guide light emitted by the pulsed broadband radiation source to a target area, wherein the light guide, or at least a portion thereof, and the pulsed broadband radiation source are adapted to be movable relative to one another.

A cleaning system comprising an apparatus, the apparatus comprising: a pulsed broadband radiation source; and a light guide adapted to guide light emitted by the pulsed broadband radiation source to a target area, wherein the light guide comprises at least a portion ahead of the pulsed broadband radiation source, relative to the target area.

A sintering system comprising an apparatus, the apparatus comprising: a pulsed broadband radiation source; and a light guide adapted to guide light emitted by the pulsed broadband radiation source to a target area, wherein the light guide, or at least a portion thereof, and the pulsed broadband radiation source are adapted to be movable relative to one another.

A sintering system comprising an apparatus, the apparatus comprising: a pulsed broadband radiation source; and a light guide adapted to guide light emitted by the pulsed broadband radiation source to a target area, wherein the light guide comprises at least a portion ahead of the pulsed broadband radiation source, relative to the target area.

A method of transmitting radiation to a target area, the method comprising: emitting radiation from a pulsed broadband radiation source; guiding the light emitted from the pulsed broadband radiation source with a light guide; and moving the pulsed broadband radiation source relative to the light guide or a portion thereof.

A method for manufacturing a composite article from a composite material, the method comprising: emitting radiation from a pulsed broadband radiation source; and guiding the light emitted from the pulsed broadband radiation source with a light guide, wherein the light guide comprises at least a portion ahead of the pulsed broadband radiation source, relative to a target area on a surface of the composite material.

The above embodiments are to be understood as illustrative examples of the invention. Further embodiments of the invention are envisaged. For example, the light guide may be a solid block of light transmitting material, with a recess or hole into which the pulsed broadband radiation source is inserted. Various other forms of light guide will be apparent to the skilled person based in the disclosure herein. For example, as indicated earlier herein, the light guide may comprise only a portion that is in front of or behind the broadband radiation source relative to the target area. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A heating apparatus to heat a substrate and/or a layer of composite material, the layer of composite material to be bonded to the substrate to form a composite article, the apparatus comprising:
   a pulsed broadband radiation source comprising a flashlamp; and
   a light guide adapted to guide light emitted by the pulsed broadband radiation source to a target area on a surface of the substrate and/or the layer of composite material, to heat the target area,
   wherein the light guide comprises at least a portion ahead of the pulsed broadband radiation source, relative to the target area, comprising a block of light transmitting material; and
   wherein an output surface of the block is multifaceted so that light exits the block to provide a predetermined radiation profile at the target area.

2. An apparatus according to claim 1, wherein the portion of the light guide ahead of the pulsed broadband radiation source, relative to the target area, comprises a shaped lens.

3. An apparatus according to claim 2, further comprising a contact surface for applying pressure by the apparatus to a contact region of an object.

4. An apparatus according to claim 3, wherein the contact region is at or near the target area.

5. An apparatus according to claim 4, wherein the target area is on the object.

6. An apparatus according to claim 3, wherein the contact surface is integral with the portion of the light guide ahead of the pulsed broadband radiation source, relative to the target area.

7. An apparatus according to claim 1, wherein the portion of the light guide ahead of the pulsed broadband radiation source, relative to the target area, comprises a hollow waveguide.

8. An apparatus according to claim 7, wherein the waveguide comprises a plurality of light reflective walls, at least one of which is movable relative to the other(s).

9. An apparatus according to claim 8, wherein the pulsed broadband radiation source is adapted to translate, tilt and/or rotate in relation to the light guide.

10. An apparatus according to claim 1, wherein the light guide comprises a portion behind the pulsed broadband radiation source, relative to the target area.

11. Apparatus according to claim 1, wherein at least a portion of the light guide is adapted to be movable relative to the pulsed broadband radiation source during operation of the apparatus.

12. An apparatus according to claim 1, wherein the light transmitting material is configured to transmit infrared wavelengths emitted by the pulsed broadband radiation source.

13. An apparatus according to claim 1, wherein the block comprises two or more segments of light transmitting material.

14. An apparatus according to claim 1, wherein the block comprises quartz.

15. An apparatus according to claim 1, wherein the block comprises silica glass.

16. An apparatus according to claim 1, wherein at least one surface of the block comprises a light reflective coating.

* * * * *